United States Patent [19]

Kalen et al.

[11] 4,195,868
[45] Apr. 1, 1980

[54] TUBULAR CLOSURE MECHANISM

[75] Inventors: David D. Kalen, Lynchburg; Jerry W. Mitchem, Bedford, both of Va.

[73] Assignee: The Babcock & Wilcox Company, New Orleans, La.

[21] Appl. No.: 878,960

[22] Filed: Feb. 17, 1978

[51] Int. Cl.² ............................................. E05C 19/06
[52] U.S. Cl. ............................................. 292/256.67
[58] Field of Search ....................... 292/19, 49, 256.67

[56] References Cited
U.S. PATENT DOCUMENTS

| 2,732,234 | 1/1956 | Lundell | 292/256.67 X |
| 3,669,481 | 6/1972 | Bergmann | 292/49 |
| 3,921,334 | 11/1975 | Black, Sr. | 292/49 X |
| 4,057,935 | 11/1977 | Rohrberg et al. | 292/19 X |

Primary Examiner—Richard E. Moore
Attorney, Agent, or Firm—Robert J. Edwards; Robert H. Kelly

[57] ABSTRACT

A closure mechanism for closing a tubular opening and releasably securing articles therein is disclosed. The closure mechanism includes an axially movable actuator and a latching member which engages the tubular opening. Means are provided for axially moving the actuator.

7 Claims, 11 Drawing Figures

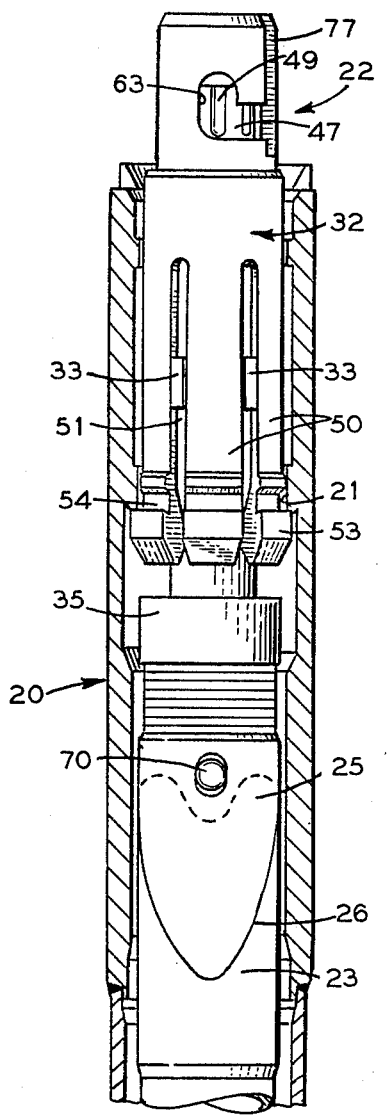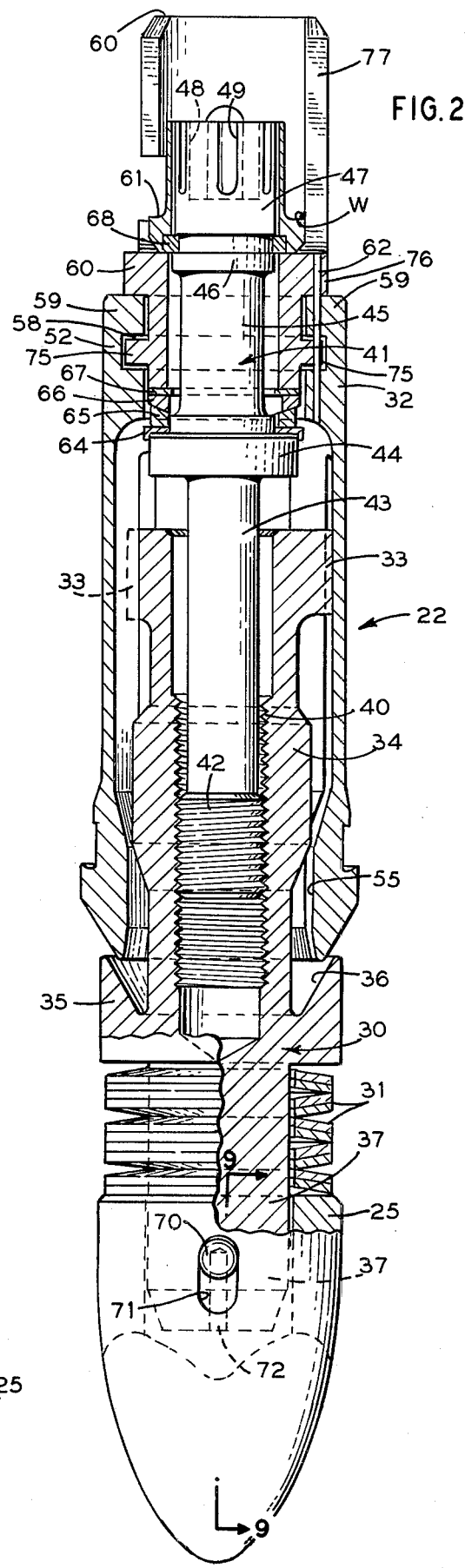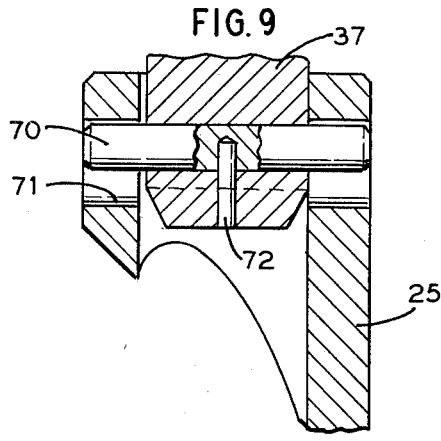

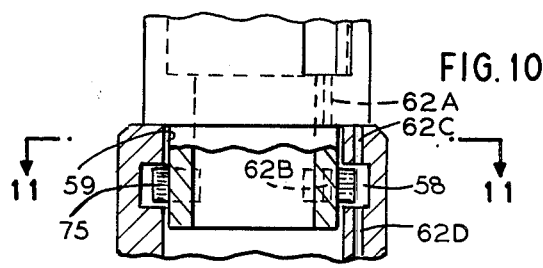
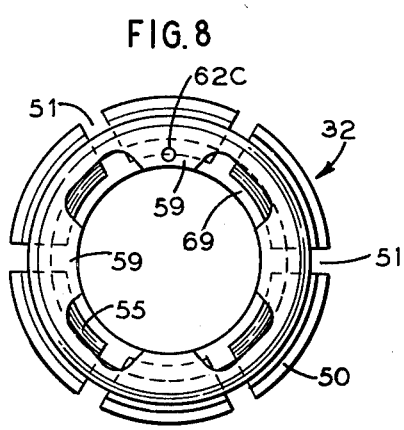
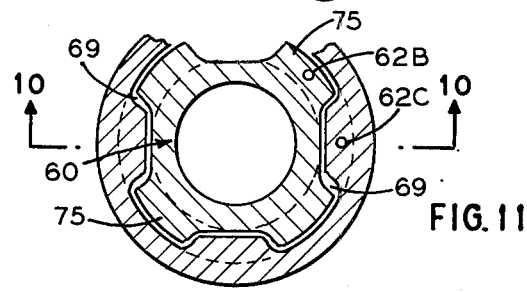
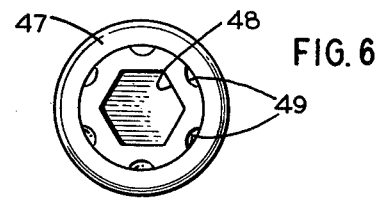
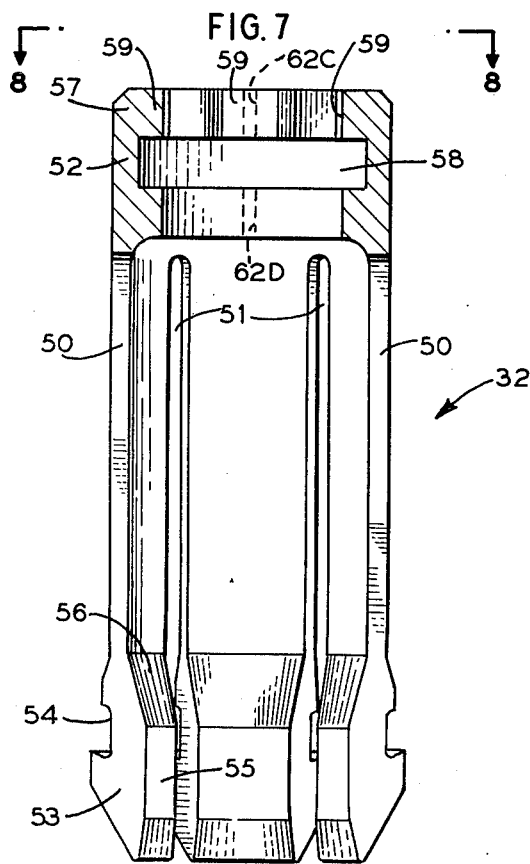
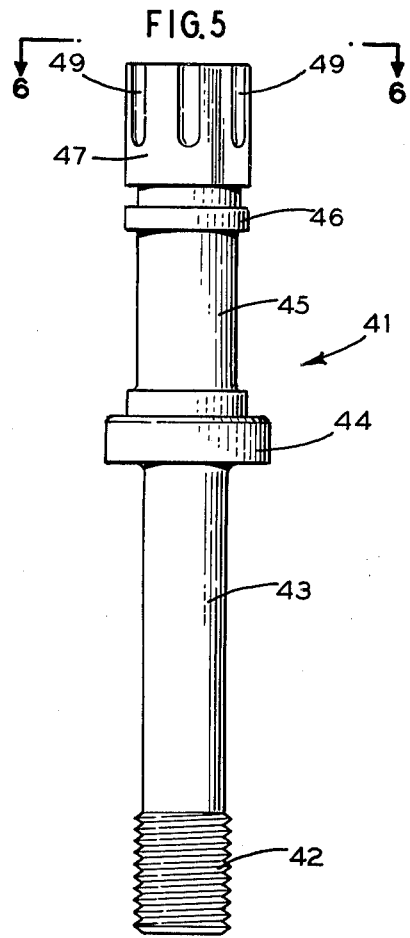

TUBULAR CLOSURE MECHANISM

BACKGROUND OF THE INVENTION

This invention relates to a closure mechanism for closing openings such as the bore of a conduit and for releasably securing members within the bore, and, more particularly, this invention relates to a closure mechanism for tubular irradiation surveillance specimen assembly holders used in nuclear reactors.

Reactor vessel material surveillance programs are designed to monitor the radiation and temperature induced changes occuring in the mechanical properties of a vessel throughout its operating life. Typically, surveillance test specimens are prepared from the actual material used in fabricating the irradiated region of the reactor vessel. The surveillance specimens are generally loaded into specimen containing capsules which, in turn, are assembled in holder assemblies inside the reactor vessel within the beltline region, defined as that region which directly surrounds the effective height of the fuel element assemblies. The surveillance capsules are located near the inside vessel wall so as to receive a neutron and thermal exposure that is representative of the exposures of the reactor vessel being monitored in order to duplicate, as closely as possible, the neutron-flux spectrum, temperature history, and maximum accumulated neutron fluence of the vessel.

The holder assemblies and surveillance capsules must permit periodic removal of the capsules and insertion of replacement capsules. Thus, the holder assemblies and surveillance capsules must be designed to facilitate withdrawal of the surveillance capsules and insertion of replacement capsules. The holder assemblies, in addition, must adequately restrain the capsules to preclude damage to or failure of the capsules due to coolant pressure and flow under both steady state and transient conditions.

In some surveillance specimen assembly designs, the specimen capsules have been longitudinally stacked and housed in vertically oriented, hollow elongated containers or holders. These elongated containers have generally been much longer than the total length of the capsules, and include an upper portion oriented above the beltline region to facilitate transfer of the capsules during insertion and removal operations. Hence, the longitudinal restraints have often taken the form of elongated bars, and the like, which traverse the distance from the top of the container to the uppermost capsule and, through spring loading, longitudinally restrain the capsules. Lateral clearances are required to permit capsule insertion and removal. Hence, in some previous designs, lateral restraint of the capsules has been omitted. In other designs lateral restraint of the capsules has been effected by limited contact of the capsules with the container wall. There are a number of inherent disadvantages to such arrangements. The spring loaded elongated longitudinal restraints have often been found to be subject to vibratory loadings that result in wear and eventual failure of the surveillance specimen assembly, particularly where lateral restraints are omitted or the capsules are subjected to hydraulic conditions which are conducive to inducing vibration. However, it remains necessary to accommodate differential thermal expansions between the specimen containing capsules and their holders.

Thus, there exists a need for a closure mechanism which can adequately restrain the specimen capsules in a holder tube without vibration while accommodating expected thermal expansions. The closure mechanism must be releasably securable and, because of its radioactive operating environment, must be capable of being handled by remote means.

SUMMARY OF THE INVENTION

In accordance with the principles of the invention, a closure mechanism is presented which closes the opening of a circular bore, such as a tube, and releasably secures articles, such as surveillance specimen capsules, within the bore.

The closure mechanism is composed of a latching member which includes a generally circular chamber with a plurality of elongated latches depending therefrom. The latching member circumscribes part of an actuator member which is disposed within the latching member so as to be axially movable. The axial movement of the actuator actuates positioning of the latches between positions in which the latches are locked and secured within the actuator member. Means, capable of being remotely manipulated, are provided to move the actuator in order to position the latches and load the articles within the tube.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 1 is a side view, partly in section, illustrating a tube closed by a closure mechanism in accordance with the invention;

FIG. 2 is a cross sectional view of a closure mechanism constructed in accordance with the invention;

FIG. 5 is a side view of another member of the closure mechanism of FIG. 2;

FIG. 6 is an end view of the member of FIG. 5 taken along line 6—6;

FIG. 7 is a side view of still another member of the closure mechanism of FIG. 2;

FIG. 8 is an end view of the member of FIG. 7 taken along line 8—8;

FIG. 9 is a cross-sectional view of part of FIG. 2 taken along the lines 9—9; and FIG. 10 is a detailed view, partly broken away, of a part of FIG. 2 that has been rotated out of alignment for illustrative purposes; and FIG. 11 is a partial sectional view of FIG. 10 taken along line 11—11.

DESCRIPTION OF THE PREFERRED EMBODIMENTS

For further details concerning the construction of a surveillance specimen assembly, see copending application Ser. No. 878,955, filed Feb. 17, 1978. The constructional details of the surveillance specimen assembly are not part of the disclosed invention and, apart from the means whereby the closure mechanism is attached to the holder tube and engages a specimen capsule, will not be described herein.

Figure 4:
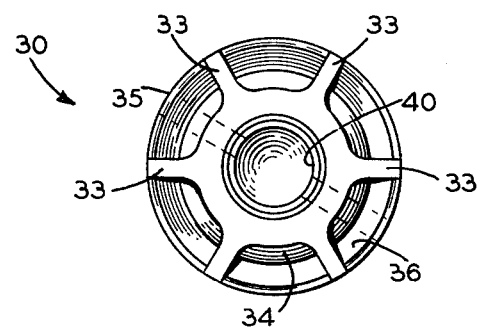
FIG. 4 is an end view of the member of FIG. 3 taken along line 4—4.
Figure 3:
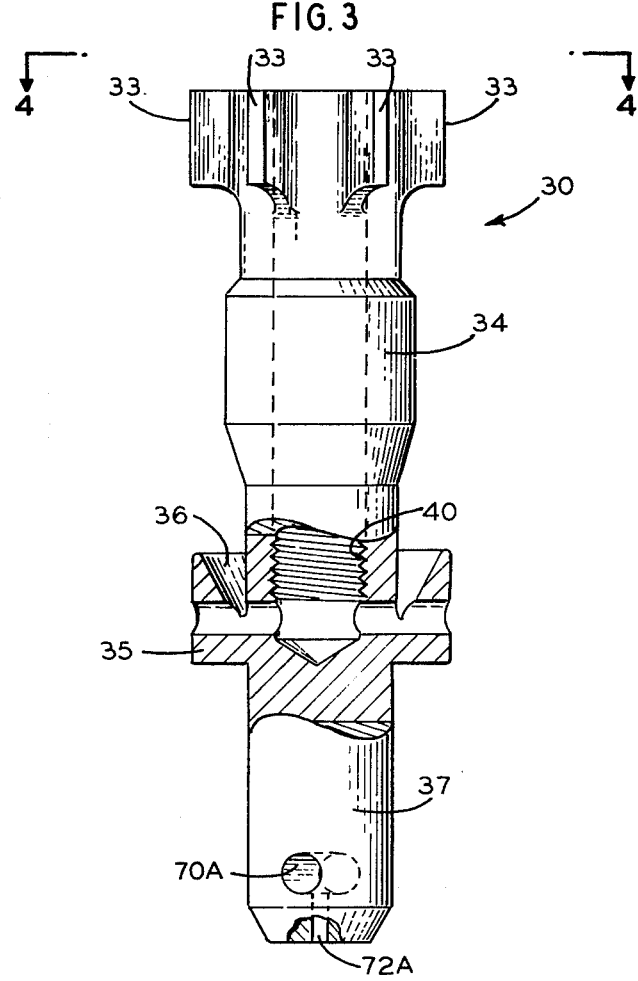
FIG. 3 is a cross sectional view of a member of the closure mechanism of FIG. 2.

Referring to FIG. 1, reference numeral 20 denotes the end portion of a surveillance specimen holder tube formed with an inner annular lip 21. The upper end of the holder tube 20 is closed with a closure mechanism 22 which extends in part into the holder tube and is provided with means for releasably engaging the annular lip 21. The closure mechanism 22 is designed to intermesh with the adjacent end of a surveillance specimen capsule 23. In this regard, as is best shown in FIG. 2, the closure mechanism 22 is provided with a V-shaped wedge 25 which projects into a complementary recess 26 (FIG. 1) that is formed in the upper end of the adjacent specimen capsule. The closure mechanism 22 includes an elongated generally cylindrical actuator member 30 which is connected at its lower end, to the V-shaped wedge 25, a stack of washer type or disc springs 31 which circumscribes, in part, the lower extremity of the actuator member 30 above the wedge 25, and a latching member 32 which substantially circumscribes that portion of the actuator member 30 above the disc spring surrounded lower part. The actuator member 30 is adapted for rectilinear movement with respect to the latching member 32, described hereinafter. As is best shown in FIGS. 3 and 4, the outer upper end of the actuator member 30 is formed with a series of parallel splines 33 which interfit with the latching member 32, as described hereinafter, so as to permit relative freedom of motion, in an axial direction, between the actuator member 30 and latching member 32. A camming surface 34 radially projects part of the outer diameter of the actuator member. The camming surface 34 is longitudinally spaced intermediate of the splines 33 and a lower radial shoulder 35 that has an upper recess 36. The actuator member includes a longitudinally extending cylindrical boss 37 projecting its lower end below the shoulder 35. In addition, the actuator member 30 is provided with a partly threaded longitudinal bore 40 (see FIG. 2 also) formed centrally within its upper end. In this regard, the closure mechanism 22, as shown in FIG. 2, includes a jack screw 41, threaded at its lower end, which extends into and engages the threaded central bore 40 of the actuator member 30.

As shown in FIG. 5, the jack screw 41 includes a lower threaded part 42 connected to an unthreaded shank 43, an intermediate radial bearing shoulder 44 connected at its lower end to the shank 43 and at its upper end to a shaft 45, an upper bearing shoulder 46 and a head 47. A recessed hexagon socket 48, FIG. 6, is provided in the head 47. The periphery of the head 47 is incised with a plurality of longitudinal flutes 49 (FIG. 5).

The latching member 32, as illustrated in FIGS. 1, 7 and 8, is essentially a slotted hollow cylindrical structure having a plurality of latching fingers or latches 50, circumferentially spaced by slots 51, which depend from one end of a generally cylindrical chamber 52. Each latching finger 50 is formed, at its lower end, with an outer heel 53 that is provided with an outwardly oriented C-shaped clamping surface 54 adapted to engage the annular lip 21 of the holder tube. An inner camming surface 55 (FIG. 7) is formed generally opposite the outer heels 53 of the latching fingers. The camming surface 55 is designed to interact with the camming surface 34 of the actuator member. A slope 56 is formed on the inner face of the latching fingers directly above the camming surface 55. As best illustrated in FIGS. 7 and 8, the chamber 52 is formed with an end 57, breeched by a series of internally projecting circumferentially spaced lugs 59, separated by spaces 69, leading to an integral internal socket 58.

As seen in FIG. 2, the latching member 32 substantially circumscribes the upper portion of the actuator member 30. The splines 33 of the actuator member, as best shown in FIG. 1, are interposed within the slots 51 of the latching member.

A breech type plug 60 (FIG. 2) surrounds the upper end of the jack screw within the chamber 52 of the latching member 32. In FIGS. 10 and 11, the breech plug 60 is shown rotated with respect to the upper end of the latching member in order to facilitate disclosure of these parts and their cooperation. The plug 60 is provided with circumferentially spaced projections 75 that extend radially outward. In this regard, the spaces 69 between the lugs 59 of the latching member accommodate longitudinal movement of the projections 75 during assembly, disassembly or, as described hereinafter, under certain conditions wherein the jack screw becomes seized. The projections 75 of the breech plug 60 are interfitted within the internal socket 58, in longitudinal alignment with the lugs 59 (shown out of alignment in FIGS. 10 and 11), to form a breech type joint. The breech plug includes an intermediate shoulder 76 which rests upon the upper end of the latching member (see FIG. 2) after the breech joint has been made. One or more slots 77 longitudinally extend from the upper end of the breech plug to the shoulder 76.

A locking sleeve 61 (FIG. 2) circumscribes the head of the jack screw within the breech plug. The locking sleeve is tack welded (W), or otherwise fixedly secured, to the breech plug.

One or more shear pins 62, penetrate through openings 62A, 62B (FIG. 10) aligned with the slots 77 in the breech plug, and openings 62C, 62D in the latching member. The shear pins securely fix the breech plug 60 to the latching member 32. A laterally disposed J-shaped slot (63) (see FIG. 1) in the upper end of the breech plug provides means for attaching a drive tool (not shown) for remotely handling the closure mechanism. Washers 64-67, circumscribing the jack screw shaft 45 in longitudinal alignment between the bottom end of the breech plug 60 and the intermediate radial bearing shoulder 44 of the jack screw; and a washer 68, circumscribing the jack screw between the upper shoulder 46 and the locking sleeve 61, provides load bearing and transmission surfaces for the jack screw.

Referring to FIG. 9, it can be seen that the V-shaped wedge 25, circumscribing the lower end of the actuator member, is fixed thereto by means of a pin 70. The pin 70 radially penetrates the lower end of the actuator member through an opening 70A (FIG. 3), and terminates in diametrically opposed oval openings 71 in the wedge 25. A second pin 72 axially penetrates the bottom of the actuator, through an opening 72A (FIG. 3), to intersect with and lock the pin 70 in place. As shown in FIG. 2, the spring stack 31 bears against the lower surface of the lower radial shoulder 35 of the actuator member and the upper surface of the V-shaped wedge 25 so as to place a spring bias force on the wedge. It should be noted that the wedge 25 is extensible, that is, capable of axial movement with respect to the actuator member within the limits of the major axis of the oval openings 71, but is restrained from rotation by the pin 70.

In operation, the closure mechanism 22 is partly inserted into the bore of a conduit such as the holder tube as is shown in FIG. 1. When the closure mechanism 22 is positioned in the holder tube 20, a drive tool (not shown) engages the socket 48 in the head 47 of the jack screw 41, and the jack screw 41 is rotated. The jack screw 41, as best shown in FIG. 2, extends through the breech plug. The washers 64–67 and 68, respectively, are arranged in a bearing relationship with the lower bearing shoulder 44 and breech plug, and the upper bearing surface 46 and breech plug. Thus, it will be understood that the jack screw itself rotates but is restrained from axial translation by the breech plug 60. The lower threaded part 42 (FIG. 2) of the jack screw coacts with threaded central bore 40 of the actuator member 30 to produce an axial translational movement of the actuator member. The initial movement of the actuator member causes the lower ends of the latching fingers 50 to be extracted from the upper recess 36 in the lower radial shoulder 35 of the actuator member which is provided to protect the fingers from interference or damage during insertion and removal operations. The continued rotation of the jack screw causes the camming surface 34 to bear against the camming surface 55 of the latching fingers 50 and actuates positioning, that is, displaces the fingers radially outward until, as shown in FIG. 1, the C-shaped clamping surfaces of the outer heels 53 make contact with the inner annular lip 21 of the holder tube. Further rotation of the jack screw causes the actuator member to transmit a longitudinal loading to the surveillance specimen capsule 23, via the V-shaped wedge 25. As shown in FIG. 1, the V-shape wedge 25 mates with the complementary shaped recess 26 cut into the upper end of the specimen capsule 23 at an oblique angle with respect to the plane normal to the longitudinal axis of the capsule.

The camming surfaces of the actuator member, which are generally disposed radially opposite the camming surface of the finger latches, bear against the latches in the locked position. Spring bias provided by the stack of disc springs 31 assures that the wedge 25 is under a minimum preload and accommodate thermal differential loadings. The jack screw 41 is rotated until the desired loading of the specimen capsule is achieved. The load is measured by the torque applied to the jack screw by the drive tool. The closure mechanism is locked in the holder tube by swaging part of the locking sleeve 61 into the flutes 49 in the head of the jack screw 41. The actuator member is axially or longitudinally movable between two positions, that is, the position in which the latches engage and are locked to the annular lip, and the position in which the heels of the fingers are secured within the upper recess in the lower radial shoulder of the actuator member. The actuator member is axially guided by the splines projecting into the circumferential spaces between the latches. This arrangement precludes rotary movement of the actuator member.

In order to remove the closure mechanism 22 from the holder tube, the swaged portion of the locking sleeve 61 is worked out of the flutes 49 in the jack screw. The jack screw is rotated in the opposite direction such that the camming surfaces of the actuator and latching members disengage, and the outer heels are drawn into the upper recess in the lower radial shoulder of the actuator member.

In the event that the threaded portion of the jack screw becomes seized to the bore of the actuator member, precluding rotation of the screw, the shear pins 62 can be sheared. Upon shearing of the pins the breech plug, actuator member, and jack screw can be rotated, as a unit, and translated through the breech connection socket in the latching member to retract the latching fingers in order to remove the closure mechanism from the tube.

In the closure mechanism's locking position, the C-shaped clamping surfaces 54 of the outer heels 53 are retained against radially inward movement by the ineraction of the camming surface 55 and backing cam surface 34.

The slope 56 above the inner camming surface 55 of the latching member is designed to coact with a complementary slope on the actuator member below the camming surface 34 so as to facilitate movement of the latches and is designed to cause the outer heels to be eased into the upper recess 36 of the actuator member, and housed therein.

Thus, the closure mechanism can be used to sufficiently load and restrain the surveillance specimen capsules under various operating conditions while spring biasing of the wedge member accommodates thermal expansions.

The terms longitudinal or axial, as used in the specification and claims, to modify movement are intended to connote movements along a lengthwise axis. Longitudinal spacing is meant to imply spaced apart in a longitudinal plane.

The embodiments of the invention in which an exclusive property or privilege is claimed are defined as follows:

1. An apparatus for closing the bore of a tubular member and releasably securing articles within the bore under longitudinal load comprising: a latching member having a cylindrical section and a plurality of circumferentially spaced elongated latches longitudinally depending from one end of the cylindrical section; an elongated actuator member having integral camming means and spline means, the actuator member being partly disposed within the latching member with the camming means radially contacting the latches and the spline means projecting into the circumferential spaces between the latches, the actuator member being axially movable between a first position in which the latches are locked to walls of the tubular member and a second position in which the latches are secured from contact with the walls of the tubular member; means, operatively connected to the latching member, for axially moving the actuator member such that said camming means actuates positioning of said latches; and means, operatively connected to the actuator member, for engaging the articles within the bore of the tubular member.

2. An apparatus as defined in claim 1, wherein said means for axially moving the actuator member includes a jack screw extending through one end of the latching member into the actuator member, the actuator member having a longitudinal bore partly threaded to engage said screw, and means connected to the latching member within said end to prevent rotation of the latching member, whereby rotation of the jack screw will initiate axial movement of the actuator member.

3. An apparatus as defined in claim 2, wherein said means for releasably locking the articles includes a wedge member extensibly attached to a second end of the actuator member and disposed outside of the latching member.

4. An apparatus as defined in claim 3, further comprising spring means mounted on the second end of the actuator member for axially loading the wedge member.

5. An apparatus for closing the bore of a tubular member and releasably securing articles within the bore under longitudinal load comprising: a latching member having a cylindrical section with a plurality of circumferentially spaced latches depending therefrom; an elongated actuator member having a plurality of longitudinally disposed outwardly extending parallel splines at one end, an outer camming surface, an internal bore extending along part of the longitudinal axis from the splined end of the actuator member, and a boss at the opposite end; the actuator member being partly disposed within the latching member such that the splines project into the spaces between the latches and the camming surface contacts the latches; a wedge member extensibly attached to the boss; means for biasing the wedge; and means for translating the actuator member such that camming surface actuates positioning of the latches to engage the walls of the tubular member to be closed and lock the articles.

6. An apparatus as defined in claim 5, wherein the means for translating the actuator member includes a jack screw threadably engaged with the internal bore of the actuator member and bearing on the latching member such that rotation of the jack screw in one direction longitudinally translates the actuator member one direction and causes the latches to radially expand to engage the walls of the tubular member.

7. An apparatus as defined in claim 6, wherein rotation of the jack screw in the opposite direction longitudinally translates the actuator member in the opposite direction and causes the latches to radially contract and to disengage from the walls of the tubular member.

* * * * *